3,320,056
LIQUID PHASE EXTRUSION FOR FORMING REFRACTORY MATERIALS

Robert F. Stoops, Raleigh, N.C., assignor to the United States of America as represented by the United States Atomic Energy Commission
No Drawing. Filed May 14, 1965, Ser. No. 456,009
14 Claims. (Cl. 75—201)

The present invention relates to a process for producing high density parts from a refractory powder by extrusion of a liquid metal phase containing said powder dissolved and/or dispersed therein.

The basic concept of this invention involves a process for obtaining a highly densified part from a refractory material powder by forming a two phase mixture comprising said powder dispersed in a metallic liquid carrier, and thereafter pressing said mixture in such a manner as to remove at least essentially all of said liquid. By "essentially all" I mean removal of sufficient liquid by extrusion to obtain a densified compact having a continuous rather than a discontinuous phase of the desired refractory material. By "refractory material" I mean a metal, alloy, or compound which melts at a temperature of at least 1500° C. Specific instances of refractory materials which may be utilized with advantage will be mentioned in the ensuing description and concrete examples.

Present day ceramic and metallurgical technology is attempting to respond to requirements for unprecedented physical and mechanical properties of materials. In general terms, the most desirable physical and mechanical properties of a refractory material are achieved when fabricated to maximum density. Present densifying techniques require either extreme conditions of temperature and/or pressure. For example, arc casting requires heating to at least the melting point. Powder metallurgical techniques usually require temperature of from $2/3$ up to $4/5$ of the absolute melting temperature in order to reach maximum density. Extremely high forming pressures are also frequently required. For example, in order to obtain densified compacts of tungsten, compaction pressures in excess of 100 tons per square inch and sintering temperatures of the order of 2000° C. for a time at temperature ranging from 30 minutes to several hours is a common technique used to obtain maximum density. Hot pressing provides some advantages over the sequence of pressing followed by pressureless sintering in that it combines both operations into one processing step, thus eliminating furnace equipment and the time taken for sintering. But hot pressing still requires massive and expensive dies owing to the high pressure and temperature operating levels. Thus, die cost is a major expense. Another method of consolidating refractory material powders involves sintering in the presence of a liquid phase. In such a process, a green compact is sintered in the presence of a liquid metal phase, the resulting consolidation and densification of the powder apparently resulting from the surface tension effects of the liquid. Effective liquid phase sintering generally requires the presence of a continuous liquid phase. The advantage of liquid phase sintering over solid state hot pressing or arc casting is that effective densification can take place at somewhat lower temperatures and lower pressures. Effective liquid phase sintering depends on the existence of a continuous liquid metal phase. The final consolidated product consists of a densified multi-phase solid containing a continuous matrix of the solidified liquid phase material within which is dispersed solid particles of a refractory material, rather than the desired continuous homogeneous phase of the refractory material. A prime example of the product resulting from liquid phase sintering which may be cited is the case of cemented carbide compositions for use in the metal working industry as cutting tools.

Thus, it will be seen that the major refractory material powder consolidation techniques such as arc casting, solid state sintering and hot pressing operations can be utilized to produce densified refractory material compacts up to theoretical density of the refractory material, but only at the expense of extreme conditions of pressure and/or temperature over extended periods of time. Consolidation by liquid phase sintering techniques does have advantages over arc casting, solid state sintering and hot pressing in terms of less stringent pressure and temperature requirements, but the product is generally multiphase and consists of a heterogeneous compact in which the liquefied metal phase solidifies as a continuous cementing phase within which is dispersed particles of the refractory material.

Considering the advantages and disadvantages of the prior consolidating techniques used to achieve maximum density, it is an object of this invention to produce a densified compact of a refractory material by extrusion of a liquid phase wherein the resultant product consists of a continuous phase of the refractory material. Another object is to provide a process which will result in a product in which any remaining solidified liquid phase does not exist as a continuous matrix phase. A further object is to provide a liquid phase extrusion technique which will result in a solid densified compact having a density approaching the theoretical density of the solid refractory material being compacted.

The objects of this invention are realized and the process of this invention is characterized by the steps of (1) forming a mixture of a sinterable refractory material powder and a material which wets and flows along the surface of said powder as a liquid to dissolve at least a small amount of said refractory powder, and in an amount which insures the formation of a continuous liquid phase of said material, and (2) heating said mixture to a temperature at which a continuous liquid phase of said material is formed and in which said refractory powder exists as a solid dispersed phase, and then pressing essentially all of the liquid phase out leaving the solid phase as a densified compact.

I have found that a most efficacious way of removing or pressing the liquid phase away from the solid dispersed phase is by extrusion of the liquefied mixture in a punch and die apparatus in which there is a small but discrete clearance between the punch and die wall to allow a removal path for the pressurized liquid phase. Best results have been obtained with a clearance running from as little as 5 to as much as 10 mils. The larger clearances are advantageous because the pressure required for extrusion of the liquid is lower compared to the pressure required for extrusion with use of the narrower clearances. Of course, clearances larger than 10 mils may be useful in certain circumstances, but excessive loss of the solid refractory phase then becomes a problem. With a punch-die clearance in the 5–10 mil range, the amount of solid refractory phase lost during extrusion is essentially equal to the amount of refractory powder dissolved in the liquid phase being extruded.

The pressure required to initiate extrusion and produce a densified compact of the refractory metal powder is extremely low compared to pressures required to reach the same density by hot pressing. For example, operating with a punch and die clearance of between 5–10 mils it generally requires only about 500 to 1000 p.s.i. to cause extrusion of the liquid phase as well as compaction and sintering of the solid refractory material phase; at clearances in the range 0.5 to 1 mil, slightly higher pressures up to 2500 p.s.i. will cause extrusion and compaction. The minimum pressure required to effect extrusion is usually only slightly higher than that required to overcome the capillary forces acting on the liquid. However, I generally find it desirable to employ a pressure of about 500 p.s.i. in excess of the minimum required to insure that maximum density of the refractory material will be obtained.

The successful practice of this invention depends to a large extent on the choice and amount of material which will form the liquid phase. As previously noted, the liquid phase must be one which will wet and flow along the surface of the refractory powder to be compacted, as well as one which has at least some capacity to dissolve the refractory powder. The condition that the material of the liquid phase will wet and flow along or over the surface of the refractory powder can be characterized by the contacting angle between a drop of the liquid on the surface of the solid powder. A contact angle of 0° indicates complete wetting while a contact angle of 180° indicates non-wetting. As a general rule, a material which develops a contact angle of less than 90° is considered to have suitable wetting properties for the purposes of this invention.

Not only must the material wet the solid, it must have the capability to dissolve at least some of the solid. A good example of this critical requirement is the dissolution or penetrating effect that some molten metals have on solid higher melting metals or refractory compounds. For example, liquid bismuth is known to disintegrate solid copper, and tungsten carbide will expand when immersed in molten cobalt. These phenomena are attributed to wetting by and penetration of, or dissolution by the liquid of the grain boundaries of the solid. Hence, such liquids would be sutiable candidate materials for the liquid phase extrusion process of this invention.

In some cases, the subsequent reaction history of the liquefied metal may determine the selection of the wetting liquid. For example, a chemical reaction between the liquid phase and the solid phase is sometimes indicated by a dewetting after wetting. In the case where the solid and liquid phases are metal, this may indicate the formation of an intermetallic compound, the existence of which may be deleterious. That is, the portion of the liquid metal which combines with the refractory metal to form the intermetallic compound can no longer serve as an extrusion medium unless the temperature is raised above the melting point of the intermetallic compound. In such cases, the efficiency of the extrusion operation may be reduced, but nonetheless still retain the essential benefit of consolidating the refractory material powder to its maximum density without a residual matrix phase. In other cases, the components of liquid and solid phases may combine to form solid solutions. This can also interfere with removal of all of the liquid phase material, but here again the essential object of removing sufficient liquid phase to avoid a continuous solid matrix thereof while forming a dense compact of the particles of the solid refractory material as a continuous phase is still realized.

The particle size of the refractory powder to be compacted has an effect on the volume of liquid retained in the finally formed compact. In general, the smaller the size of the refractory material powder the less the amount of liquid phase which will be retained after extrusion. Thus, in a case where the object in point is to obtain a densified compact of tungsten carbide by liquid phase extrusion with liquid cobalt, I have found that when the average particle size of the tungsten carbide powder was 15 microns, approximately ten volume percent of cobalt remained in the densified compact in the spaces created by the mechanical interlocking of the relatively large tungsten carbide particles. By contrast, when tungsten carbide with an average particle size of 2.2 microns was used, extrusion of the liquid phase was accomplished within a few minutes and no cobalt could be detected in the densified tungsten carbide.

The amount of liquid phase necessary to obtain the benefits of this invention may vary from as little as 5 to in excess of 100%, by volume, of liquid, relative to the volume of powder to be compacted. In operational terms, the minimum abount of liquid necessary is that volume which will create a continuous liquid phase. In addition, the liquid must be one which will dissolve at least some of the refractory material to be sintered. In this connection, I have made sereval attempts to form compacts by extrusion of a liquid phase in which the material was virtually insoluble. For example, in one case I used a liquid phase comprising mercury in which was dispersed tungsten carbide powder; and in another case I tried copper as the liquid phase and tungsten carbide as the refractory material. In both cases there was insufficient extrusion of the liquid phase to realize a compact with a continuous phase of the densified refractory powder. It is thought that the solubility of the refractory material in the liquid at the extrusion temperature is necessary so that points of contact between adjacent particles can be dissolved, thus permitting the particles to come into close proximity. This presumably takes place by selective dissolution of the points of contact of the particles. This concept may explain why there must be a substantial volume percentage of liquid present. That is, there should be enough liquid to dissolve a large percentage of the points of contact so that the particle surfaces contact one another more completely. Solution of points of contact should then decrease as the liquid becomes saturated with the refractory material. Beyond this point, it is visualized that the refractory material will precipitate in places where the potential for solution is less than at points of contact until an equilibrium is established between solution at points of contact and precipitation at other positions. This is a proposed mechanism and not to be taken in a literal or absolute controlling sense. Assuming it does represent a reasonably approximate picture, it would then appear that equilibrium is attained rapidly since the extrusion time necessary to effect removal of the liquid and produce a compact of the desired density in a product having a continuous refractory phase takes place generally within a very short time running from 1 to about 6 minutes.

Having described the general inventive concept together with the operational parameters which permit the specific and related objects to be attained, the following concrete examples will illustrate the invention in further detail.

*Example I*

The object of this example is to show how this process was used to form a very high density pellet of UC (uranium monocarbide) at a relatively low temperature.

A mixture was prepared by blending 7.8 gm. of −200 mesh $UH_3$ (uranium hydride) and 0.2 gm. of −200 mesh carbon black. A bottom punch was inserted into the bottom of a die in a punch-die unit and the above mixture of powders was poured in the top of the die, the powder mixture being retained in the die by the top surface of the bottom punch. The top punch was then inserted in the die. O.D. of the punches was 0.500 inch and I.D. of the die was 0.501 inch. Both punches and the die were made of alumina. The punches were centerless ground, and the dies were honed with diamond powder to insure uniform clearance. This assembly was then placed in a hot press. The chamber of the hot press was then evacuated to a pressure of 0.01 micron, and a force of 185 pounds was applied to the top punch which produced a pressure of 940 p.s.i. on the powder mixture in the die. The die assembly and the powder therein were heated by a tantalum metal susceptor in a water-cooled induction coil. Temperature was measured by a thermocouple which was adjacent to the outside of the susceptor. The temperature was raised slowly from room temperature until the decomposition of the $UH_3$ to uranium metal and hydrogen had been completed. The rate of heating was actually controlled by the rate of liberation of hydrogen.

That is, the hot press was continuously evacuated, and the temperature was raised at such a rate that the total pressure of gases in the hot press did not exceed 400 microns. By this procedure approximately two hours were required to reach a temperature of 800° C. At this temperature, the UH₃ conversion to uranium metal was virtually complete as indicated by the drop of the gas pressure in the hot press to 1 micron. The pressure on the specimen was then increased to 2000 p.s.i. and the temperature was raised from 800° C. to 1000° C. in seven minutes. During this time part of the uranium metal reacted with the carbon to form UC. This reaction occurs rapidly at about 900° C. The composition was such that after this reaction the specimen consisted of about 60 volume percent UC and 40 volume percent uranium metal. After an additional six minutes of heating, the uranium melted as shown by the movement of the top punch. This movement began when the temperature of the specimen was approximately 1130° C., the melting point of uranium. The pressure on the specimen was then raised to 2500 p.s.i. while the temperature was maintained at 1138° C. for two minutes. After melting of the uranium occurred, movement of the ram was observed for about one minute, indicating that the liquid uranium was being forced out of the specimen and extruded between the punch and die walls. The heat source was then cut-off, and the specimen was allowed to cool in the hot press. When the die assembly had cooled approximately to room temperature, it was removed from the hot press. The specimen was then removed from the die. The UC specimen produced by the above procedure was 0.5 inch O.D. and 0.16 inch high, and it had a density of 13.55 gm./cc. which is 99.6% of the theoretical density of UC. Microscopic examination of a polished section of this specimen showed that it contained less than 1% uranium metal and uranium dioxide contamination. If desired, the remaining metal can be eliminated by high temperature volatilization—a process familiar to those skilled in the art of powder metallurgy. Virtually no porosity was observed.

*Example II*

This example illustrates how the liquid phase extrusion process has been used to make a dense WC (tungsten monocarbide) shape for use as a platen in high temperature compression testing of ceramic materials.

A mixture was prepared by blending 8.0 gm. of WC powder having an average particle size of 2.2 microns with 1.5 gm. of −325 mesh cobalt powder. This material was placed in a graphite die set in which the O.D. of the punches was 0.500 inch and I.D. of the die was 0.507 inch. The die set was then placed in a hot press and an initial pressure of 1000 p.s.i. was applied to the top punch of the die set. The die set was heated directly by means of an induction coil, and temperature was measured by sighting with an optical pyrometer on the bottom of the die. A flow of argon gas was established through the furnace, and then the die set and specimen were heated rapidly to a temperature of 1500° C. in about 30 minutes. At about 1300° C., movement of the top punch began and the load was raised to 2000 p.s.i. After approximately six additional minutes of heating, the temperature of the die set and specimen rose to about 1425° C. at which point movement of the top punch ceased. It is thought that all of the cobalt metal had been extruded between the punch and die walls at this time since no additional punch movement was observed. However, the pressure was raised to 5000 p.s.i., and heating was continued until a temperature of 1500° C. was reached. This temperature was maintained for five minutes before heating was discontinued. After the die set containing the specimen had cooled to room temperature in the argon atmosphere, the specimen and punches were pressed out of the die. The specimen obtained was 0.5 inch O.D. and 0.14 inch thick. It had a density of 15.6 gm./cc. which is the theoretical density of WC. Microscopic examination at 2000 magnification showed that this specimen was virtually free of porosity, and no cobalt was detected. The cobalt content of the original mixture of powders was 25 volume percent. The die showed no signs of wear, and the punches were used again after the solidified extruded metal had been removed by dissolving said metal in acid.

*Example III*

A mixture was prepared by blending 8.3 gm. of tungsten powder having an average particles size of one micron with 1.7 gm. of −325 mesh nickel powder. This material was placed in an alumina die set having a punch-die clearance of six mils. The die set was then placed in a hot press. The hot press was evacuated to approximately 0.2 micron, and then a pressure of 90 p.s.i. was applied to the specimen by means of the top punch and ram. Heat was generated with a tantalum resistance element, and temperature was measured with an optical pyrometer by sighting directly on the alumina die. The temperature of the die set and specimen was raised from room temperature to 1550° C. in approximately 40 minutes. When this temperature was reached, the pressure on the specimen was increased to 2000 p.s.i. This temperature and pressure was then maintained for six minutes. The specimen was allowed to cool to room temperature in the die set in the evacuated hot press and then removed from the die set by applying pressure to the top punch. The dimensions of the resultant compact measured 0.5 inch O.D. and 0.13 inch high. Its density was 18.4 gm./cc. whereas the density for tungsten found in the literature varies between 18.6 and 19.1 gm./cc. Microscopic examination of this specimen showed that it contained less than 3 volume percent of nickel, whereas 30 volume percent of nickel was present in the original mixture of tungsten and nickel powders.

It will be seen that the several concrete examples illustrate the general technique of utilizing a liquefied metal phase to aid or take part in a sintering-densification operation, but which is removed during or while it has performed this function. The use of the liquid phase in this manner permits the attainment of densified compacts of the refractory material heretofore attainable, if at all, at much higher temperatures and/or pressures.

The process as herein-described is applicable to obtain densified compacts of many refractory materials. In particular, it is applicable to the consolidation to maximum density of such materials as:

(1) The refractory transition metals of Groups IVa, Va and VIa of the Periodic Table including titanium, zirconium, hafnium, vanadium, niobium, tantalum, chromium, molybdenum and tungsten;

(2) Other high melting metals such as rhenium, ruthenium, iridium, rhodium, palladium, and thorium;

(3) Alloy systems selected from (1) or (2) which have a melting point in excess of 1500° C.;

(4) Refractory transition metal compounds of Groups IVa, Va and VIa of the Periodic Table such as:

(5) Borides including $TiB_2$, $ZrB_2$, $HfB_2$, $NbB_2$, $TaB_2$;

(6) Carbides including TiC, ZrC, HfC, VC, NbC, TaC, MoC, WC and binary metal carbides in the type 5f of rare earth series including UC, $U_2C_3$, $UC_2$, ThC, $ThC_2$, PuC, $Pu_2C_3$, and double carbides as exemplified by $4TaC \cdot ZrC$;

(7) Nitrides including TiN, NbN, ZrN, HfN, TaN, UN, $U_2N_3$, $UN_2$, ThN and PuN;

(8) Oxides which melt above the melting point of $SiO_2$ including $SiO_2$, and such oxides as BeO, $Al_2O_3$, $TiO_2$, $ZrO_2$, $La_2O_3$, rare earth oxides of the 4f series such as $CeO_2$ and $Eu_2O_3$, or CaO, $HfO_2$, MgO, $Nb_2O_3$, $Ta_2O_5$, $Y_2O_3$, rare earth type 5f oxides such as $UO_2$ and $ThO_2$, and complex oxides thereof existing as solid solutions or as compounds;

(9) Silicides of Group IVa, Va and VIa of the Periodic Table as well as the silicides of uranium, thorium and plutonium;

(10) Mixtures of any of the refractory materials in 1–9.

Once having made the selection of refractory materials or materials in powder form, from 1–10 above, a liquid carrier is selected from one which wets and flows along the surface of the selected powder. A liquid dispersion of the powder and carrier is formed using sufficient carrier to obtain a continuous liquid phase. Extrusion of the liquid phase then proceeds as described. The liquid carrier medium which wets and flows on the refractory material should, of course, have a melting point below the melting point of the refractory material. Generally, a difference in melting point of at least 200° C. is preferred. Among the metals which may be used for this purpose are aluminum, silicon, zinc, tin, bismuth, iron, nickel (as in Example III), cobalt (as in Example II), uranium (as in Example I), and alloys of said metals in which they are a principal alloying ingredient. In the case where the refractory material is an oxide or silicate and other oxide covered by the class of oxides defined in (8) above, a glass composition may conveniently serve as the liquid phase.

Having described my invention in general terms, together with a disclosure of controlling parameters, and including concrete examples of the mode of carrying out my invention, the following claims will define the scope of my invention in the light of the preceding disclosure.

Having thus described my invention, I claim:

1. A method of powder compaction which comprises (1) forming a mixture of a sinterable refractory powder and a material which wets and flows along the surface of said powder as a liquid to dissolve at least a small amount of said powder and in an amount which insures the formation of a continuous liquid phase of said material, (2) heating said mixture to a temperature at which a continuous liquid phase of said material is formed and in which said refractory powder exists as a solid dispersed phase, and (3) then concurrently pressing essentially all of the liquid phase out leaving the solid phase as a densified compact.

2. The method according to claim 1 wherein the refractory powder is selected from at least one metal having a melting point in excess of 1500° C., an alloy of said metal, or an intermetallic compound of said metal, said alloy and intermetallic compound having a melting point in excess of 1500° C.

3. The method according to claim 1 in which the refractory powder is selected from at least one of the following carbides: TiC, ZrC, HfC, VC, NbC, TaC, MoC, WC, EuC, UC, $U_2C_3$, $UC_2$, ThC, PuC, $Pu_2C_3$, and complex carbides thereof.

4. The method according to claim 1 in which the refractory powder is selected from a metal oxide having a melting point in excess of the melting point of $SiO_2$ and including $SiO_2$.

5. The method according to claim 1 in which the refractory powder is selected from at least one of the following nitrides: TiN, EuN, NbN, HfN, TaN, UN, $N_2N_3$, $UN_2$, ThN and PuN.

6. The method according to claim 1 in which the refractory powder is selected from at least one silicide of a metal selected from Group IVa, Va and VIa of the Periodic Table.

7. The method according to claim 1 in which the material comprising the liquid phase contains a metal having a melting point at least 200° C. less than the melting point of the refractory material of the dispersed phase.

8. A method of powder compaction which comprises (1) forming a mixture of a sinterable refractory powder and a material which wets and flows along the surface of said powder as a liquid to dissolve a small amount of said powder and in an amount which insures the formation of a continuous liquid phase of said material, (2) heating said mixture to a temperature at which a continuous liquid phase of said material is formed and in which said refractory powder exists as a solid dispersed phase, and (3) then pressing essentially all of the liquid phase out leaving the solid phase as a densified compact whose metallurgical structure displays an essentially continuous skeleton of the sintered refractory powder with any of the remaining material exists as inclusions within said structural skeleton.

9. A method of forming a densified compact of tungsten carbide which comprises forming a dispersion of powdered tungsten carbide in a liquid metal carrier phase which wets and flows along the surface of said powder and has a limited capacity to dissolve said tungsten carbide, and then hot pressing out essentially all of said liquid carrier leaving a solid tungsten carbide sintered compact.

10. The method according to claim 9 wherein the liquid carrier phase is liquid cobalt.

11. A method of forming a densified compact of tungsten which comprises forming a dispersion of powdered tungsten in a liquid metal carrier phase which wets and flows along the surface of said powder and has a limited capacity to dissolve said tungsten, and then hot pressing out essentially all of said liquid carrier leaving a solid tungsten sintered compact.

12. The method according to claim 11 in which the liquid carrier phase is liquid nickel.

13. A method of forming a densified compact of uranium carbide which comprises forming a dispersion of powdered uranium carbide in a liquid metal carrier phase which wets and flows along the surface of said powder and has a limited capacity to dissolve said uranium carbide, and then hot pressing out essentially all of said liquid carrier leaving a solid uranium carbide sintered compact.

14. The method according to claim 13 wherein the liquid carrier phase is liquid uranium.

References Cited by the Examiner
UNITED STATES PATENTS

| | | | |
|---|---|---|---|
| 2,686,117 | 8/1954 | Wulff | 75—223 |
| 2,744,011 | 5/1956 | Samuel et al. | 75—206 |
| 3,118,764 | 1/1964 | Hammond et al. | 75—204 |
| 3,213,032 | 10/1965 | Hammond et al. | 75—205 |
| 3,264,101 | 8/1966 | Takeya et al. | 75—223 |

BENJAMIN R. PADGETT, *Primary Examiner.*

R. L. GRUDZIECKI, *Assistant Examiner.*